(12) United States Patent
Daly et al.

(10) Patent No.: US 12,169,894 B1
(45) Date of Patent: Dec. 17, 2024

(54) SYSTEMS AND METHODS FOR GENERATING DYNAMIC OCCLUSION INFORMATION

(71) Applicant: Meta Platforms Technologies, LLC, Menlo Park, CA (US)

(72) Inventors: Gregory Mayo Daly, Seattle, WA (US); Jack Thomas Lavier, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 253 days.

(21) Appl. No.: 17/938,222

(22) Filed: Oct. 5, 2022

(51) Int. Cl.
*G06T 19/00* (2011.01)
*G06T 15/40* (2011.01)

(52) U.S. Cl.
CPC .......... *G06T 15/405* (2013.01); *G06T 19/006* (2013.01); *G06T 2210/12* (2013.01)

(58) Field of Classification Search
None
See application file for complete search history.

(56) References Cited

U.S. PATENT DOCUMENTS

2021/0125414 A1* 4/2021 Berkebile ............... G06F 3/017

\* cited by examiner

*Primary Examiner* — Steven Z Elbinger
(74) *Attorney, Agent, or Firm* — Jordan IP Law, LLC

(57) ABSTRACT

A method includes accessing a scene graph defining a spatial relationship of a plurality of first bounding boxes associated with a plurality of virtual objects in a field of view of a user of an artificial reality (AR) device; accessing a second bounding box associated with a first bounding box of the plurality of first bounding boxes; determining, based on the second bounding box, a subregion within a sensing region of a depth sensor; obtaining first depth data within the subregion; generating, based on the first depth data, a three-dimensional model for one or more real objects; determining a visibility of a first virtual object in the AR environment associated with the first bounding box based on the three-dimensional model for the one or more real objects; and generating an output image of an AR environment based on the determined visibility of the first virtual object.

20 Claims, 7 Drawing Sheets

SYSTEMS AND METHODS FOR GENERATING DYNAMIC OCCLUSION INFORMATION

TECHNICAL FIELD

This disclosure generally relates to computer graphics, and more particularly to graphics rendering methodologies and optimizations for generating artificial reality, such as virtual reality and augmented reality.

BACKGROUND

Computer graphics, in general, are visual scenes created using computers. Three-dimensional (3D) computer graphics provide users with views of 3D objects from particular viewpoints. Each object in a 3D scene (e.g., a teapot, house, person, etc.) may be defined in a 3D modeling space using primitive geometries. For example, a cylindrical object may be modeled using a cylindrical tube and top and bottom circular lids. The cylindrical tube and the circular lids may each be represented by a network or mesh of smaller polygons (e.g., triangles). Each polygon may, in turn, be stored based on the coordinates of their respective vertices in the 3D modeling space.

Even though 3D objects in computer graphics may be modeled in three dimensions, they are conventionally presented to viewers through rectangular two-dimensional (2D) displays, such as computer or television monitors. Due to limitations of the visual perception system of humans, humans expect to perceive the world from roughly the same vantage point at any instant. In other words, humans expect that certain portions of a 3D object would be visible and other portions would be hidden from view. Thus, for each 3D scene, a computer-graphics system may only need to render portions of the scene that are visible to the user and not the rest. This allows the system to drastically reduce the amount of computation needed.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Generating accurate occlusion in AR environments usually requires sampling or modeling the user's environment. However, generating and persistently updating models of the user's entire environment requires significant amounts of time and computing resources (e.g., power, bandwidth, etc.), which are particularly important considerations for AR devices. Particular embodiments disclosed herein utilize bounding volume hierarchy (BVH) data structures to reduce the computing resources required for occlusion and rendering of real or virtual objects in artificial reality environments. For example, information regarding one or more real or virtual objects may be stored and tracked in the user's environment using a BVH that defines one or more spatial relationship of one or more real or virtual objects located within the user's environment. In particular embodiments, each real or virtual object in this BVH may have one or more data structures that describe the spatial relationship, for example and not by way of limitation, a region of interest (ROI), bounding box, or an axis-aligned bounding box (AABB). Utilization of a BVH permits for accelerated visibility and rendering operations that allow the computing system to understand which real or virtual objects are present in the user's environment and which objects are likely to have regions (e.g., triangles) that will may be occluded. By generating occlusion information (e.g., a mesh) only for targeted areas or regions of interest in the user's environment where virtual objects may appear, significant improvements in latency and resource requirements can be achieved without a significant degradation of the user's AR experience.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
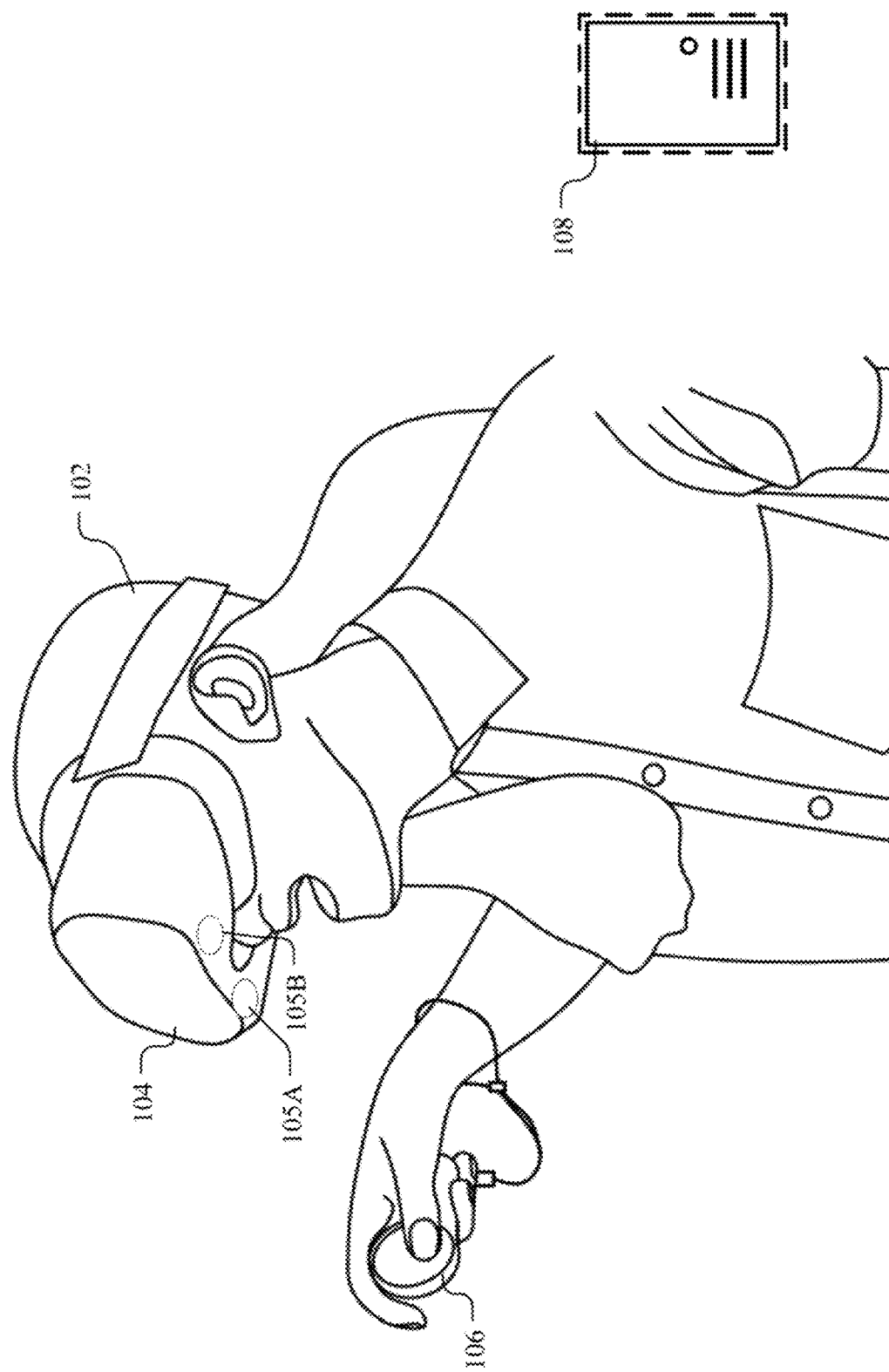
FIG. 1A illustrates an example artificial reality system and user.

FIG. 1A illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102. The HMD 104 may include an audio device that may provide audio artificial reality content to the user 102. The headset 104 may include an eye tracking system to determine a vergence distance of the user 102. A vergence distance may be a distance from the user's eyes to objects (e.g., real-world objects or virtual objects in a virtual space) upon which the user's eyes are converged. The headset 104 may be referred to as a head-mounted display (HMD). One or more controllers 106 may be paired with the artificial reality system 100. In particular embodiments, one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

The artificial reality system 100 may further include a computer unit 108. The computer unit may be a stand-alone unit that is physically separate from the HMD or it may be integrated with the HMD. In embodiments where the computer 108 is a separate unit, it may be communicatively coupled to the HMD via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 1B:
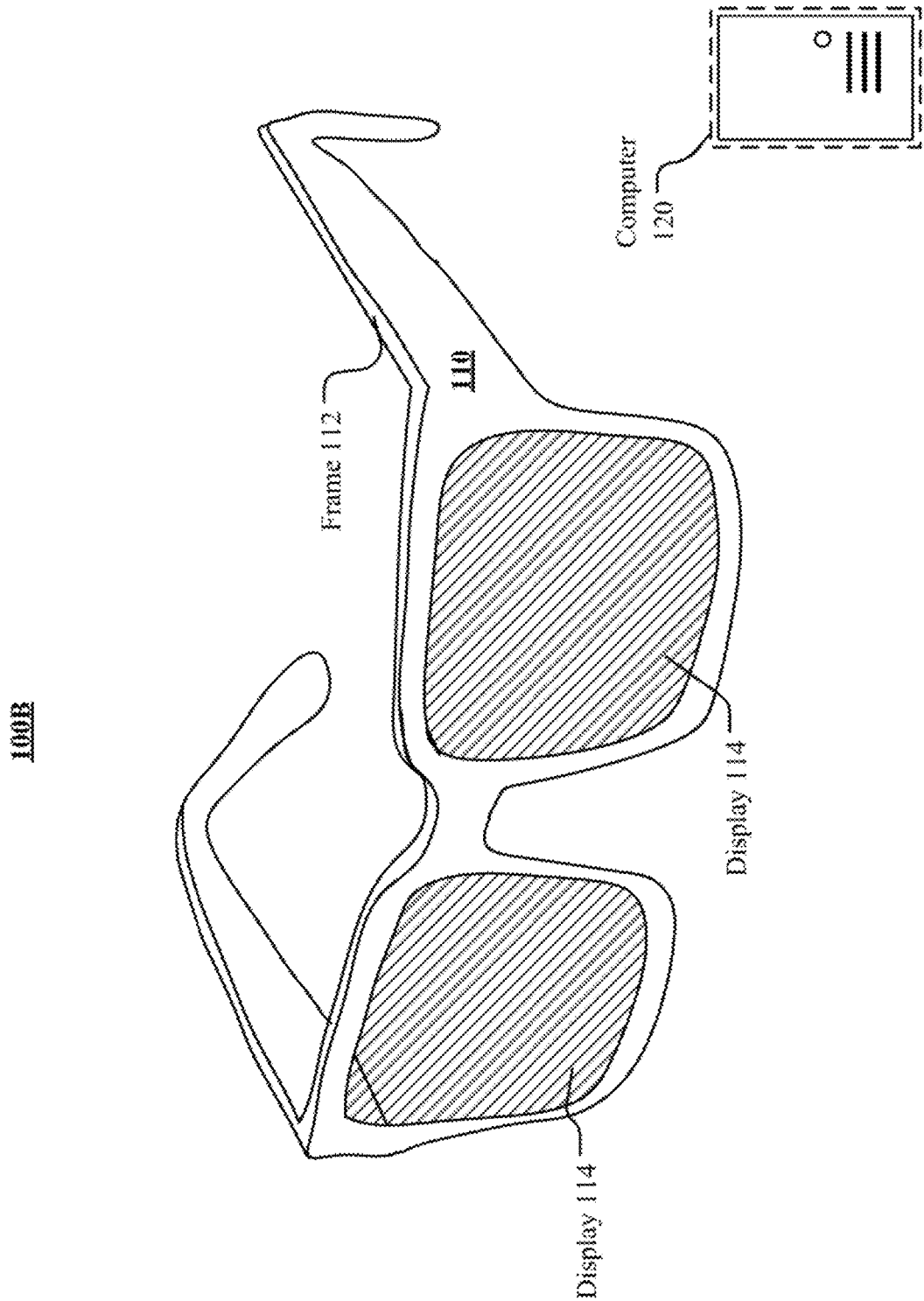
FIG. 1B illustrates an example augmented reality system.

FIG. 1B illustrates an example augmented reality system 100B. The augmented reality system 100B may include an augmented reality head-mounted display (AR HMD) 110 (e.g., glasses) comprising a frame 112, one or more displays 114, and a computing system 120. The displays 114 may be transparent or translucent allowing a user wearing the AR HMD 110 to look through the displays 114 to see the real world and displaying visual artificial reality content to the user at the same time. The AR HMD 110 may include an audio device that may provide audio artificial reality content to users. The AR HMD 110 may include one or more cameras which can capture images and videos of environments. The AR HMD 110 may include an eye tracking system to track the vergence movement of the user wearing the AR HMD 110. Except as where specified throughout this application, the use of "HMD" can be used to refer to either HMD 104 (which may occlude the user's view of the real environment) or AR HMD 110 (which may permit the user to see the real world and displaying visual artificial reality content to the user at the same time).

The augmented reality system 100B may further include a controller comprising a trackpad and one or more buttons. The controller may receive inputs from users and relay the inputs to the computing system 120. The controller may also provide haptic feedback to users. The computing system 120 may be connected to the AR HMD 110 and the controller through cables or wireless connections. The computing system 120 may control the AR HMD 110 and the controller to provide the augmented reality content to and receive inputs from users. The computing system 120 may be a standalone host computer system, an on-board computer system integrated with the AR HMD 110, a mobile device, or any other hardware platform capable of providing artificial reality content to and receiving inputs from users.

The HMD may have external-facing cameras, such as the two forward-facing cameras 105A and 105B shown in FIG. 1A. While only two forward-facing cameras 105A-B are shown, the HMD may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras 105A and 105B are configured to capture the physical environment around the user and may do so continuously to generate a sequence of frames (e.g., as a video).

In particular embodiments, the pose (e.g., position and orientation) of the HMD within the environment may be needed. For example, in order to render an appropriate display for the user 102 while he is moving about in a virtual or augmented reality environment, the system 100 would need to determine his position and orientation at any moment. Based on the pose of the HMD, the system 100 may further determine the viewpoint of either of the cameras 105A and 105B or either of the user's eyes. In particular embodiments, the HMD may be equipped with inertial-measurement units ("IMU"). The data generated by the IMU, along with the stereo imagery captured by the external-facing cameras 105A-B, allow the system 100 to compute the pose of the HMD using, for example, SLAM (simultaneous localization and mapping) or other suitable techniques.

To provide an immersive and realistic artificial reality experiences for users, artificial reality systems must quickly and accurately provide proper occlusion of virtual objects in the user's environment. For example, as a virtual cat moves across a room, it may be occluded by one or more regions of one or more real objects (e.g., a table) or another virtual object in the room as displayed to the user. Real objects may include both static objects (e.g., a building, couch, etc.) and dynamic objects (e.g., humans, pets, vehicles). Occlusion techniques in artificial reality (AR) systems (e.g., augmented reality and mixed reality) typically rely on a map of the user's environment to determine which pixels of an object to shade (e.g., pre-occluding), or to generate surfaces (e.g., masks) of real-world objects that can be used to determine visibility. These models can then utilized to account for occlusion when rendering.

However, generating and persistently updating maps of the user's entire environment requires significant amounts of time and computing resources (e.g., power, bandwidth, etc.), which are particularly important considerations for AR devices due to size considerations. Oftentimes, the slim profile and ergonomic design of AR devices results in limited system resources and a limited power supply, and these limitations may not be appreciably reduced without resulting in too much weight, size, and/or heat for the user's comfort. Accordingly, techniques for reducing the computing resources required for generating occlusion information may provide a significant advantage over existing methods.

Particular embodiments disclosed herein reduce the computing resources required for occlusion and generating output images of artificial reality environments by providing for occlusion of objects in AR environments by generating occlusion information (e.g., a mesh) only for targeted areas or regions of interest in the user's environment where virtual objects may appear. As used herein, an object may refer to a real object in the real environment or a virtual object rendering in an AR environment. In particular embodiments one or more occlusion objects and bounding boxes corresponding to one or more particular real or virtual objects may be stored and tracked in the user's environment using a data structure such as a scene graph. Utilization of a scene graph permits for accelerated visibility and rendering operations that allow the computing system understand which real or virtual objects are present in the user's environment and which objects are likely to have regions (e.g., triangles) that will may be occluded. The structure of the scene graph may further define a spatial relationship of one or more real or virtual objects located within the user's environment. In particular embodiments, each real or virtual object in this scene graph may have one or more data structures that describe the spatial relationship, for example and not by way of limitation, a region of interest (ROI), bounding box, or an axis-aligned bounding box (AABB) associated with one or more virtual objects in the field of view of a user of an artificial reality device, for example and not by way of limitation an HMD. Such techniques may generate significant decreases in computing resources and latency for rendering and other operations as described herein.

Figure 2:
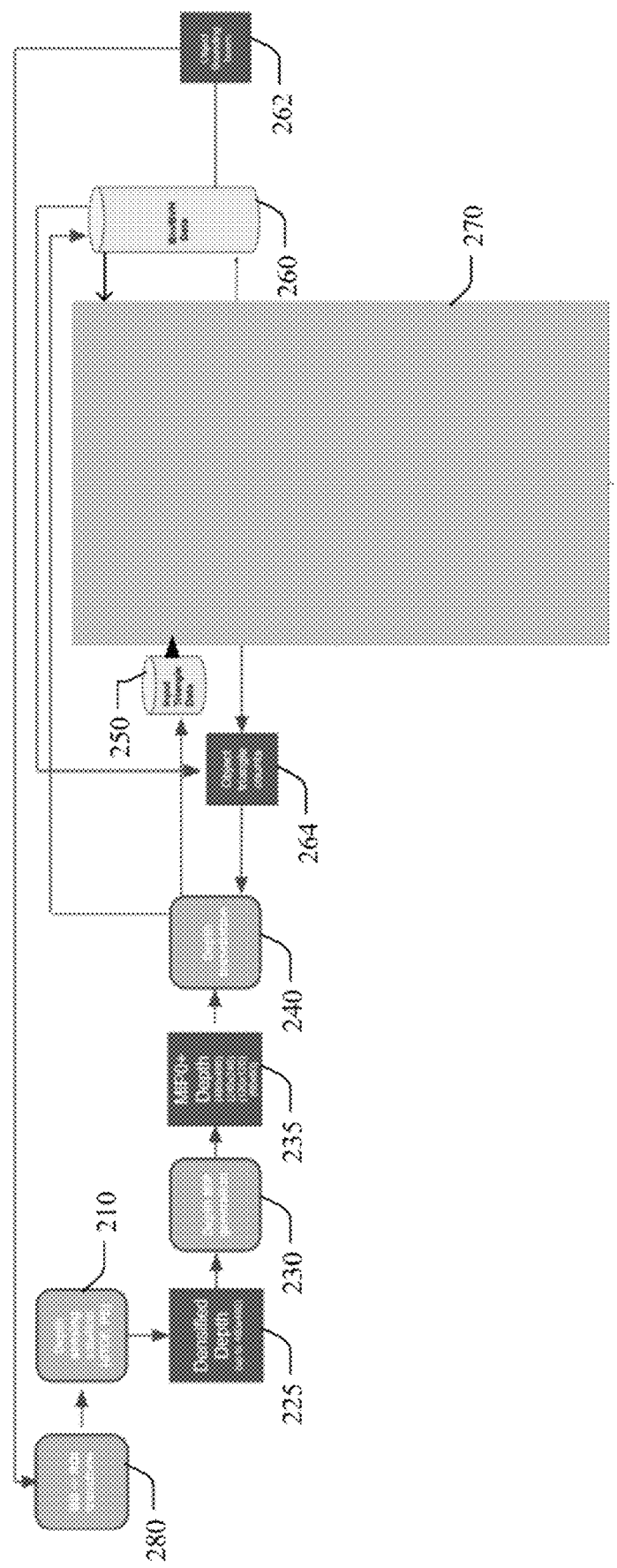
FIG. 2 illustrates a process for utilizing a scene graph in AR systems for various operations.

FIG. 2 illustrates a process 200 for utilizing a scene graph in AR systems for various operations. In particular embodiments, process 200 may enable GPUs to utilize computer vision data (e.g., object data, depth information, etc.) to improve rendering operations by reducing latency and computing resources required to perform particular operations. As an example, process 200 enables a computing system to convert depth data to a mesh (e.g., tessellation) and texture of one or more objects in the environment to enable one or more operations through the GPU. Such operations permit greater hardware efficiency, resulting in faster and more accurate rendering while reducing required computing resources (e.g., power consumption, bandwidth, etc.).

In particular embodiments, process 200 may begin at step 210, where a computing system obtains depth data of a real environment. The depth data may be determined relative to a particular pose or viewpoint of a user of an HMD in the real environment. In particular embodiments the depth data may be for a region or subregion of the real environment. In particular embodiments the depth data may be sparse depth data. In particular embodiments the computing system may access depth data from one or more sensors to improve the fidelity of sparse depths or make the depth data more accurate. Depth data may be accessed through, for example and not by way of limitation, one or more sensors (e.g., a direct time of flight sensor, passive stereo, sparse sensor), SLAM data, image data, machine learning models, previously generated three-dimensional models of the environment, etc.). The sensors may be located on the HMD worn by the user. In particular embodiments, image data or sensor data used to access the depth data of the real environment may be obtained through one or more cameras or one or more depth sensors located on the HMD worn by the user. In particular embodiments depth data may be represented as a texture in the computing system, which enables efficient generation of depth maps and mipmaps in particular steps in process 200.

In particular embodiments, at step 220 the computing system may generate one or more densified depth maps of the real environment 225, or of one or more regions or subregions of the real environment, based on the depth data received in step 210. The densified depth maps 225 may provide a representation of the depth of one or more coordinates, objects, or surfaces in the environment from a particular location, for example and not by way of limitation the current pose or viewpoint of the user of the HMD.

In particular embodiments multiple densified depth maps 225 may be generated for the same region or subregion at various resolutions (e.g., 480×480, 240×240, 120×120, 60×60, etc.) that may provide a grid or map of depth values for the environment at varying fidelities. In certain non-limiting embodiments, the one or more sensors used to access depth data may operate at a lower resolution (e.g., 60×60), and the computing system may utilize image data to augment or interpolate the low-resolution depth data to densify and generate one or more densified depth maps into a regular grid at a higher resolution than the resolution of the received depth data (e.g., augmenting or interpolating depth data collected by a 60×60 depth sensor to generate, for example and not by way of limitation, 480×480, 240×240, or 120×120 densified depth maps).

In particular embodiments, at step 230 the computing system may generate one or more mipmaps 235 of the real environment representing a sequence of images and depths of one or more objects or surfaces of a given texture in the environment from a particular location. In particular embodiments the mipmaps 235 may be generated based on a current pose or viewpoint of the user of the HMD. Mipmapping techniques can be utilized to efficiently generate one or more mipmaps 235 at different resolutions (e.g., 480×480, 240×240, 120×120, 60×60, etc.). For example, at step 230 a mipmap 235 may be generated that corresponds to a particular resolution of each densified depth map generated at step 225. This may result in a set of mipmaps 235 for a series of resolutions (e.g., 480×480, 240×240, 120×120, 60×60, etc.) that include depth data based on the densified depth maps 225. It should be appreciated that many different methods can be used to effectively smooth data at a lower fidelity (e.g., 60×60) to generate depth data of a region at varying resolutions, as would be known and understood to a person of ordinary skill in the art. However, mipmapping may be preferable is often computationally cheaper and more efficient when compared to similar techniques.

In particular embodiments, at step 240 the computing system may generate one or more depth tessellations (e.g., a 2D or 3D model) of one or more objects in the real environment, or of one or more desired regions in the environment (e.g., an area encompassing or surrounding an object). For example, a 3D mesh may be generated that represents an object in the environment. In particular embodiments the 3D mesh may be based on the depth data. For example, a 3D mesh is generated by selecting one of the mipmaps 235 generated at step 230 and generating a polygon mesh (e.g., triangles) by connecting each vertex in the grid of the mipmap to its neighbors in every direction. In this manner, the computing system can receive a mipmap representing depths of one or more regions of the environment and transform it into a depth tessellation that provides a reasonable fidelity representation of all of the occluding objects in the region, regardless of whether they are static or dynamic.

In particular embodiments, the resolution of a particular depth tessellation (e.g., the number of polygons in the mesh) may vary based on the particular mipmap 235 selected by the computing system to generate the depth tessellation at step 240. Providing for depth tessellations of varying fidelities offers many advantages that can reduce computing resources requirements. For example, the particular resolution of the depth tessellation may vary based on, for example and not by way of limitation, the computing resources available to render the virtual scene (e.g., a polygon or triangle budget), the location of a bounding box or region of interest relative to a current pose of the user (e.g., a higher resolution depth tessellation could be used for objects that are closer to the user), or the location of the bounding box relative to the user's foveal area (e.g., higher resolution depth tessellation is used for objects in or near the user's foveal area). It should be appreciated that depth tessellations at different resolutions (e.g., the number of polygons in the particular mesh) can be generated using a variety of architectures and methodologies, for example and not by way of limitation, marching cubes. However, certain non-limiting embodiments of the present disclosure use mipmaps of various resolutions to generate depth tessellations at varying resolutions, as this method often requires less power, data storage, and computation resources than other similar techniques.

In particular embodiments the computing system may generate a corresponding occlusion object for one or more objects in the environment. In particular embodiments the occlusion object may be used to determine a visibility of a virtual object based on the three-dimensional model for the one or more real objects. In particular embodiments the occlusion object may be a two-dimensional surface or a three-dimensional model (e.g., a mesh). The occlusion object may represent an object, or a region or subregion of the environment (e.g., an area that comprises one or more objects) in the artificial reality environment as displayed to the user from a particular pose or viewpoint. For example, each pixel of the occlusion object may represent the occlusion and blending (e.g., a transparency of a pixel as displayed to the user due to one or more virtual objects or real objects that may occlude, blur, or otherwise visually distort the appearance of the an object as viewed by the user. In this manner, proper occlusion of the object in the environment relative to one or more other real objects or virtual objects can be easily determined and displayed to the user, for example by occluding a portion of the real object in the environment if a virtual object passes in front of the real object. In particular embodiments an corresponding occlusion object may be generated based on the depth tessellations or mipmaps for a particular real object.

In particular embodiments, the present disclosure permits efficient foveated rendering in AR environments. Conventional techniques often lack support for efficient foveated rendering because they assume that each region (e.g., polygon) in the mesh representing the environment must have equal value, weight, and write-to quality. By generating a series of mipmaps 235 at varying resolutions, one or more of which can be selected at step 240 to generate one or more depth tessellations of various regions of the environment, the present disclosure further provides advantages over conventional systems by permitting efficient utilization of foveated rendering in AR environments. Thus, when conventional systems generate a three-dimensional mesh of an AR environment, every region of the user's viewpoint is often treated the same and contains equal fidelity regardless of position, including the computational resources expended. The equal treatment is not suitable or not optimized for foveated rendering, which is often desirable in AR as described herein. In contrast to conventional methods, embodiments disclosed herein may permit different resolution mipmaps and depth tessellations to be selected for different regions in the environment. In particular embodiments, the mipmap selected at step 240 to generate a depth tessellation for a particular region or object may depend on various factors, either individually or combination, for example and not by way of limitation the characteristics of the operation (e.g., rendering, occlusion, etc.), computing system (e.g., type of hardware, etc.), type and pose of the object in the environment (e.g., the pose relative to the user, whether the object is static or dynamic, etc.), or one or more characteristics of the user or the AR application (e.g., pose, eye-tracking, application user is interacting with, etc.) as described herein.

In particular embodiments a particular resolution mipmap 235 may be selected by the computing system to perform depth tessellation 240 depending on one or more characteristics of the object, such as the pose or location of the object, the size of the object, or whether the object is static (e.g., a couch) or dynamic (e.g., a pet). For an object located at a great distance from the user, a low resolution mipmap (e.g., 60×60) may be utilized to generate the depth tessellation to conserve computing resources because the fidelity or aesthetic appearance of the object may be less important to providing an immersive AR experience (due to, for example, the distance of the object from the user). In contrast, for an object located relatively nearer to the user, a relatively higher resolution mipmap (e.g., 480×480, 240×240) may be utilized to generate the mesh because the user is more likely to notice any inaccuracies or unnatural occlusions in the appearance of the object.

In particular embodiments a particular resolution mipmap 235 may be selected by the computing system to perform depth tessellation 240 may be based on the available computing resources for rendering (based on, for example, the hardware in the HMD or the complexity of the geometry of the scene). Such considerations may be also referred to as the available "polygon budget," since it represents the quantity of polygons (and therefore the resolution of the mesh) that can be rendered at step 240 when considering available computing resources and capabilities. Due to the desired design of HMDs as lightweight and ergonomic for the user to wear for extended periods, the available computing resources and polygon budget for rendering and occlusion may be limited by the computing hardware associated with the HMD. Computing resources may also be limited, for example, by previous generations of hardware relative to newer computing systems. For example, a previous generation device with lower power resources may select a lower resolution mipmap 235 to generate a lower fidelity mesh (e.g., 5,000 polygon budget) at step 240 for a particular object to conserve available computing resources, whereas a latest generation device with greater relative resources may select a higher resolution mipmap 235 to generate a higher fidelity mesh (e.g., 20,000 polygon budget) for a particular object in order to optimize image aesthetics and resulting AR experience for the user. As another example, available resources and polygon budget may be limited by a complex scene with higher relative quantities of objects. If the polygon budget for the entire scene is 64,000 polygons, a scene with eight objects in the environment that need to be rendered may have less polygons available to allocate amongst each of the eight rendered objects relative to a scene with only two objects that need to be rendered.

In particular embodiments, a particular resolution mipmap 235 may be selected by the computing system to perform depth tessellation at step 240 may be based on one or more characteristics of the user (e.g., the pose of the user, the gaze of the user, etc.). Understanding where in display space (and by extension worldspace) the user is looking may be utilized to generate higher-fidelity depth tessellations for objects that are likely to be located within an area of focus, or fovea, which provides the most immersive and aesthetically pleasing renderings for objects in these fovea for the user. In an AR scene, it may be further desirable to generate lower-fidelity meshes for objects out of the fovea or at the peripheral of the user's view. Such techniques allow the computing system to reduce computing resources (e.g., reduce the number of polygons generated for a particular mesh) without significantly impacting the immersiveness of the user's AR experience. In particular embodiments the computing system may further access head-tracking or eye-tracking data to determine one or more fovea of the user in the environment. Based on this determination, the computing system may select lower resolution mipmaps for objects located on peripheral portions from the user's fovea to generate depth tessellations at step 240 with less detail and conserve computational resources expended on these areas. In contrast, it may be desirable to generate higher-fidelity meshes for objects at the focus of the user's view. Based on this determination, the computing system may select higher resolution mipmaps for objects located in or around the user's fovea to generate depth tessellations at step 240 with higher detail.

In particular embodiments the resolution of a particular mesh may be additionally or alternatively based on the quantity of different depths of a particular object. For large or geometrically complex objects (e.g., a vehicle, a tree, etc.) different points on the object may have multiple depth values relative to user. For such objects, it may be computationally advantageous to utilize, for example and not by way of limitation, a point cloud or depth map of the object to identify several points with similar depths. In particular embodiments this determination may be based on a statistical analysis, for example by binning one or more depth values in a histogram. Based on this determination, the computing system may reduce several points on an object at the same or nearly the same depth to one point. Such techniques reduce the number of vertices and therefore reduces the number of polygons required for a particular mesh.

In particular embodiments, one or more of the depth tessellations and related data (e.g., metadata regarding the fidelity, object represented by the tessellation, etc.) generated at step 240 may be stored in input triangle data store 250 and provided to the GPU 270 for various operations, for example computer vision operations (e.g., occlusion) and rendering operations. For example, a depth tessellation may be utilized by GPU 270 to shade one or more pixels to represent occlusion in the rendered image of the environment. In particular embodiments one or more corresponding occlusion objects for a particular object may be provided to GPU 270 for various operations, for example computer vision (e.g., occlusion) and rendering operations.

In particular embodiments, the computing system may generate an output image of a view of a scene of an artificial reality environment for display to a user. As an example and not by way of limitation, this initial output image of a view may be a view of an AR artificial reality environment including a set of virtual objects. The computing system may utilize a ray-casting or other rendering process, such as ray tracing, for determining visual information and location information of one or more virtual objects that are to be displayed within a view of an artificial reality environment. In particular embodiments, the first computing system (e.g., a laptop, a cellphone, a desktop, a wearable device) may perform this first ray-casting process to render a view of an artificial reality environment. A "view" of an artificial reality environment may refer to a user perspective of the artificial reality environment, which may, for example, be determined based on a current position and orientation of an HMD. This use of the ray-casting process may be referred to herein as a "visibility test," because it may be used to determine a visibility of a virtual object relative to one or more real objects in the environment by comparing a three-dimensional model for the one or more real objects with a bounding box or occlusion object corresponding to a virtual object in the environment. The ray-casting process may ultimately be used to associate pixels of the screen with points of intersection on any objects that would be visible for a view of an artificial reality environment.

Figure 3:
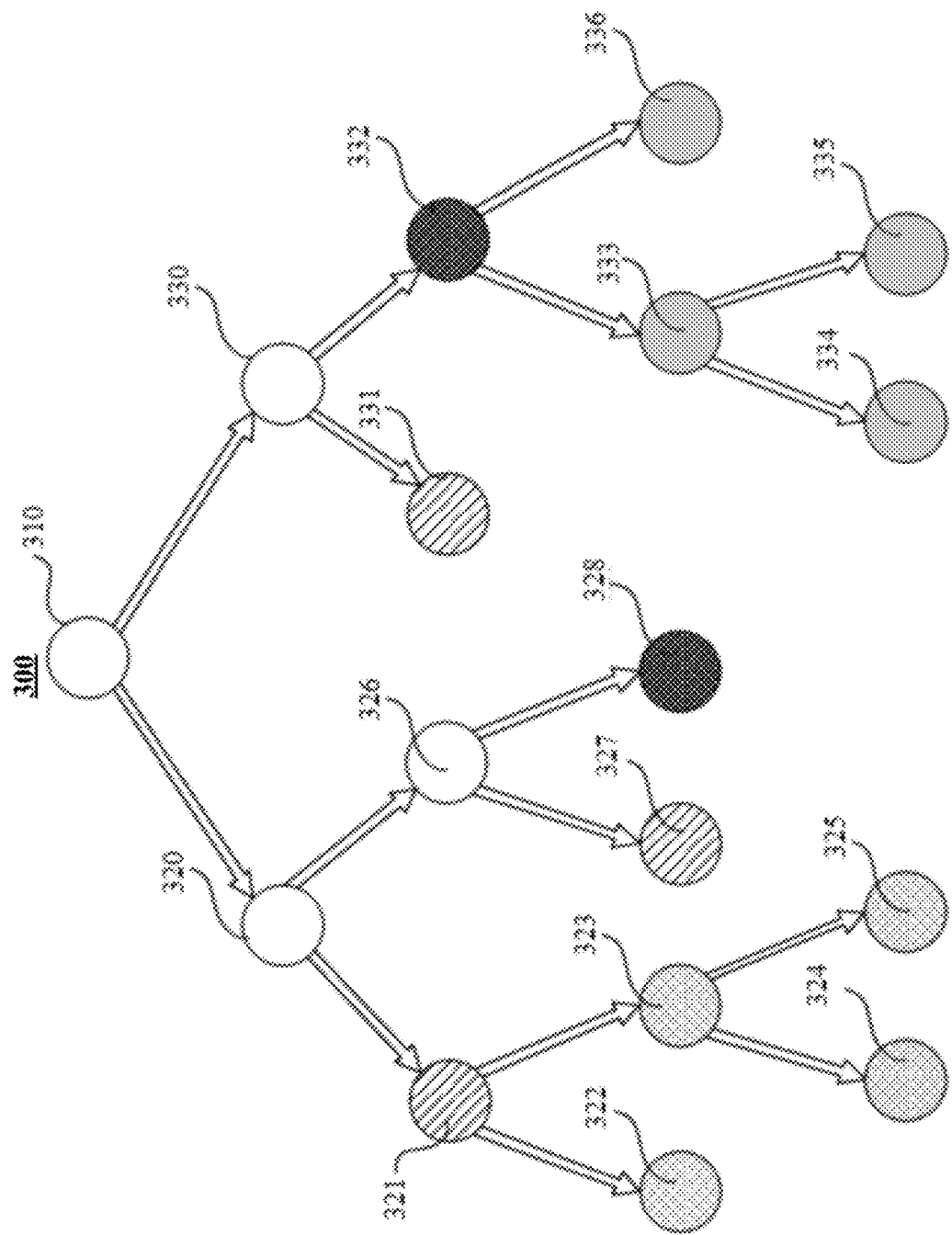
FIG. 3 illustrates an example of a BVH tree data structure.

In particular embodiments one or more of the depth tessellations generated at step 240 may be stored in a scene graph, for example and not by way of limitation bounding volume hierarchy (BVH) data structure (e.g., bin/BVH store) 262. FIG. 3 illustrates an example of a BVH tree data structure 300. Each node (e.g., 310, 320-328, 330-336) in the tree 300 may be associated with a bounding volume in the 3D modeling space in which objects are defined. The tree 300 may have a root node 310 that is associated with a large bounding volume that encompasses the bounding volumes associated with the child nodes 320-328, 330-336. Node 320 may be associated with a bounding volume that contains the bounding volumes of its child nodes 321-328 but not the bounding volumes of nodes 330-336. Node 321 may be associated with a bounding volume that contains the bounding volumes of its child nodes 322-325 but not the bounding volumes of any of the other nodes. Node 322 may be associated with a bounding volume that contains geometries (e.g., triangles) but not any other bounding volume. In particular embodiments a corresponding occlusion object for each stored mesh may also be stored in the BVH. As such, when traversing the BVH for various operations as described herein, the computing system may call up both the stored mesh for a particular object or region of the environment, and the stored occlusion object that corresponds to the particular object or region of the environment.

In particular embodiments the BVH data structure in particular embodiments may comprise a top-level acceleration structure (TLAS). For example, in particular embodiments one or more BVHs could be generated per object, and then connected together via a TLAS (e.g., scene graph) that corresponds to the current user viewpoint. Such a configuration may permit only recalculating the TLAS as the scene changes. In particular embodiments the TLAS may be used to provide for more efficient tracking and rendering of objects in a scene over a period of time, for example as the user or the objects move throughout the environment. For example, at a first time a virtual object may be located in the vicinity of a real object in the environment. At a second time, the virtual object may have moved away from the real object, such that the real object and virtual object are no longer near one another. The TLAS may provide efficient management and access to the stored depth tessellations and occlusion objects for both the virtual object and the real object that may be utilized by the GPU for rendering. Such a technique allows the computing system to access depth tessellations and occlusion objects only for a particular region or depth the environment based on the locations of the virtual objects and real objects in the environment. In particular embodiments the computing system may further generate a corresponding occlusion object for one or more of the real or virtual objects in the environment. In particular embodiments there may be one occlusion object for each virtual object. Such a mapping provides particular advantages. For example and not by way of limitation, both the virtual object and occlusion object may point to the same instance AABB to minimize the load on vertex transform. As another example and not by way of limitation, if a particular virtual object goes out of the view frustum of the user, only one visibility check needs done instead of two to reduce computing resources (e.g., when the GPU is rendering a particular virtual object, it would only need to check the associated occlusion object for occlusion and ignore all the other occlusion objects that might be in the scene.)

Particular embodiments disclosed herein may utilize the scene graph to determine a location of one or more objects to determine where to search for physical objects. For example and not by way of limitation, if there is only one virtual object directly in front of the user, the computing system may conserve resources and reduce latency by limiting the field of search of the scene graph to the space in front of the user surrounding the virtual object. The sampled information in the field of search (e.g., depth tessellations, occlusion objects, etc. for the area surrounding the virtual object) may be used by the computing system render an image of the object. For example, the depth tessellation and occlusion object stored in the BVH may be used to provide particular advantages for both computer vision (e.g., occlusion) and rendering applications performed by the GPU in AR applications. For example, whether a particular object (or portion thereof) in the user's environment is visible or occluded from a particular viewpoint may be determined by performing a visibility analysis based on the depth tessellation and bounding box or occlusion object stored in the BVH. Using the BVH to limit the field of search to a particular node or section of the BVH structure may result in more efficient operations with reduced latency.

In particular embodiments data stored in bin/BVH store 260 may be used to accelerate or reduce latency associated with one or more steps of process 200. For example, the output of GPU 270 and stored input bin/BVH data 260 may be used to generate output polygon (e.g., triangle) counts 264 rendered by the GPU 270, which represent the number of polygons in a particular depth tessellation of an object in the environment used by GPU 270 for rendering. Although FIG. 2 depicts triangle counts, it should be appreciated that object counts represented in 264 can be any polygon. For purposes of considering computing resources in depth tessellation, in particular embodiments only polygons used to render objects (e.g., opaque polygons) may be considered in the triangle count 264 for purposes of the polygon budget. In contrast, dark polygons (e.g., occlusion objects) should not be considered in the polygon budget. Accordingly, in particular embodiments, the polygon counts 264 may be less than the number of polygons generated for a particular mesh at depth tessellation step 240 based on the output of GPU 270 for occlusion. For example, if the GPU 270 receives a 64,000 polygon mesh representing all of the objects in the environment, but based on the visibility tests only 45,000 polygons are utilized to render the particular object, the effective polygon count 264 for the particular object is 45,000 polygons.

In particular embodiments output polygon counts 264 may be utilized in subsequent instances of process 200 as input for depth tessellation step 240. This input provides the computing system with information regarding the actual available polygon budget based on the current occlusion of the environment for future iterations of process 200. For example, if the GPU 270 receives a 64,000 polygon mesh representing all of the objects in the environment, but all of the objects in the scene use only 45,000 triangles for rendering or occlusion, there may be 19,000 triangles left over for use in object occlusion. For future iterations of process 200 the computing system may, at step 240, utilize the remaining polygon budget (e.g., the remaining 19,000 polygons) for rendering particular objects or areas of the environment, for example and not by way of limitation on nearer objects or objects near the fovea of the user. This allows the computing system to generate higher-fidelity depth tessellations of the environment in future iterations of process 200 using a more accurate estimation of the available polygon budget based on the current occlusion of the environment from the viewpoint of the user.

In particular embodiments, depth data or data stored in bin/BVH store 260 may be used to generate one or more bounding boxes at step 262 associated with one or more objects or one or more regions in a field of view of a user of an artificial reality (AR) device. In particular embodiments the one or more bounding boxes may be stored in a scene graph that defines a spatial relationship of each bounding box. In particular embodiments a second bounding box in the scene graph may be associated with a first bounding box in the scene graph. For example, a first bounding box may encompass a plurality of objects within the environment, whereas the second bonding box may encompass only one of the plurality of objects within the environment. Bounding boxes 262 may be two-dimensional (e.g., representing the 2D area surrounding an object from the user's viewpoint) or three-dimensional (e.g., representing the 2D area surrounding an object and a depth range to encompass a volume surrounding an object in worldspace). In particular embodiments one or more bounding boxes 262 may be an axis-aligned bounding box (AABB). In particular embodiments the bounding box associated with each object may be stored in the BVH and may share the same instance transform and instance with its associated occlusion object.

In particular embodiments the size of the bounding box can be adjusted based on the size of the occlusion object for a particular object, depending on the particular implementation of the described embodiments. For example, if the occlusion object is significantly smaller or larger than the AABB, the size of the AABB can be adjusted to match or more closely resemble the boundaries of the occlusion object. As another example, in particular embodiments if the update rate of occlusion data is slow compared to the rendering rate, the corresponding AABB of the occlusion object can be expanded to provide a buffer such that the occlusion object will still permit occlusion throughout a larger range of motion of the virtual object. Such a process effectively provides a tradeoff between the dynamic speed of the object represented by the occlusion object and the data size. In particular embodiments, for every described virtual object, a related occlusion object is created and stored in the BVH.

In particular embodiments the bounding box may be utilized in subsequent iterations of process 200 to track the environment. For example, using a bounding box for the virtual object, the computing system can identify a position of a virtual object relative to a real object to understand potential interaction and occlusion between the two objects. Such a technique allows for rendering and other operations without a semantic understanding of the absolute location of objects in the real environment.

In particular embodiments, one or more occlusion objects or bounding boxes may be provided to the GPU to accelerate rendering. For example, when the GPU renders a virtual object, it may access one or more occlusion objects stored in the BVH that are associated with the virtual object. In this manner, the GPU can avoid occlusion objects in the scene that would not be relevant to the particular virtual object based on the location of the one or more bounding boxes. In this manner, computing resources can conserved to optimize rendering. As another example, the computing system may use the bounding box to identify a range of depths where the objects are located, and use this range of depths as a z-buffer in the rendering engine. In this manner, when occluding the computing system may determine that any pixel that has a depth greater than an existing z-value in the z-buffer will not be shaded.

At step 280, one or more bounding boxes 262 may be further utilized to track the locations of objects for subsequent instances of process 200 to generate one or more regions of interest 280 for one or more particular objects or areas in the real environment. Regions of interest 280 may be based on a transformation of bounding box 262 of a particular object of interest (e.g., an occlusion object, object being rendered, etc.). A region of interest 280 may represent a two-dimensional area or a three-dimensional cubic volume surrounding an object or area in the environment. A particular advantage of a three-dimensional region of interest may be the ability to filter out one or more objects that filter out objects that are too far/close to the user. For example, if a region of interest comprises the volume around a real chair and virtual object that are located at a depth between 6-8 meters from the user of the HMD, the region of interest may be used to filter objects located outside the 6-8 meter depth.

In particular embodiments the size or other characteristics of the region of interest may vary based on one or more qualities of the corresponding real or virtual object or area encompassed by the region of interest. For example, the size of the region of interest may vary based on whether the object is static or dynamic, the current speed of the object, etc. For a region of interest surrounding a dynamic or semi-dynamic object (e.g., a cat), the region of interest may be proportionally larger than the cat (e.g., twice the volume of the cat) to account for potential movements. In contrast, for a static object (e.g., a couch), the region of interest may be roughly the same size as the static object.

In particular embodiments a benefit of generating a region of interest at step 280 may be the ability to transform the spatial information contained within bounding box 262 (e.g., in worldspace) into a format that the depth sensing subsystem can utilize in further steps of process 200 to conserve computing resources and reduce latency. For example, determining, a bounding box may be used to determine a subregion within a sensing region of a depth sensor for future iterations of process 200. Unlike conventional graphics rendering systems, where an image is rendered to the entire screen or field of view of the user, in certain embodiments of artificial reality systems rendering may be sparsely limited only to portion or portions of the field of view where virtual objects are located (e.g., roughly 10-40% of the field of view). Thus, for AR systems, it may be possible to improve performance and reduce computing resources by limiting sampling or modeling of the environment to particular regions of interest. For example and not by way of limitation, a depth sensor used to collect or access depth data at step 210 may have a resolution of 512×512, which produces large quantities of depth data when sampling. If this high resolution depth sensor samples the entire field of view or real environment of the user, the computing system must collect, transport, and process a large quantity of depth data given the size of the sample region and resolution of the depth sensor. Instead, by utilizing region of interest 280 to reduce the region of the environment that is sampled by the depth sensor to the region of interest 280. This may allow the computing system to conserve computing resources and decrease latency by not sampling the entire field of view and not processing large quantities of depth data collected by the depth sensor.

For example, consider a virtual object to be rendered and occluded that is located in the upper-left quadrant of the user's field of view and is located at a depth of 4 meters from the current pose of the user in the artificial reality environment. Traditional rendering systems may sample depth data for the entire field of view or environment at depths. But for purposes of rendering the virtual object in artificial reality, depth data collected outside of the upper-left quadrant of the user's field of view and at depths greater than 4 meters may be extraneous. Instead, in particular embodiments a generated region of interest 280 comprising a particular virtual object in the environment may be utilized to conserve resources in process 200 by reducing the region of the environment that is sampled by a depth sensor or similar at step 210. In particular embodiments this reduction may be achieved by reducing the two-dimensional search space of the field of view of the user (e.g., on the x-axis and y-axis in the user's field of view). For example, for the virtual object only located in the upper-left quadrant of the user's two-dimensional field of view, the depth sensor may, based on the region of interest, only collect depth data in this upper-left quadrant. In particular embodiments this reduction may additionally or alternatively be achieved by reducing the depth search space in the environment (e.g., on the z-axis in the user's field of view). For example, for the virtual object located 4 meters from the user, the depth sensor may, based on the region of interest, only collect depth data for a particular depth range (e.g., between 0 and 4 meters from the user). In this manner, the region of interest 280 can be used as a z pre-pass to limit the collection and processing of depth information to real objects between the user and the depth of the object, or within the particular range of the object. In particular embodiments, if the depth sensor associated with the artificial reality device is capable of limiting its sampling space to one or more sub-regions of the field of view, it may limit depth data collected to these corresponding regions. As another example, if the depth sensor is only capable of sampling the entire field of view, the computing system may, prior to processing or transmitting the sampled depth data, extract depth data that is limited to the one or more regions of interest for further processing according to one or more steps of process 200.

In particular embodiments, one or more steps of method 200 may be additionally or alternatively performed by a second computing system and transmitted to a first computing system. In particular embodiments the second computing system may be relatively powerful (e.g., a laptop, smartphone, etc.) when compared to the first computing system, because the first computing system (e.g., a HMD) may have limited system resources that may not appreciably be increased without resulting in too much weight, size, and/or heat for the user's comfort.

Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for utilizing bounding volume hierarchy in AR systems to reduce resource requirements and latency including the particular steps of the method of FIG. 2, this disclosure contemplates any suitable method for utilizing bounding volume hierarchy in AR systems to reduce resource requirements and latency including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 4:
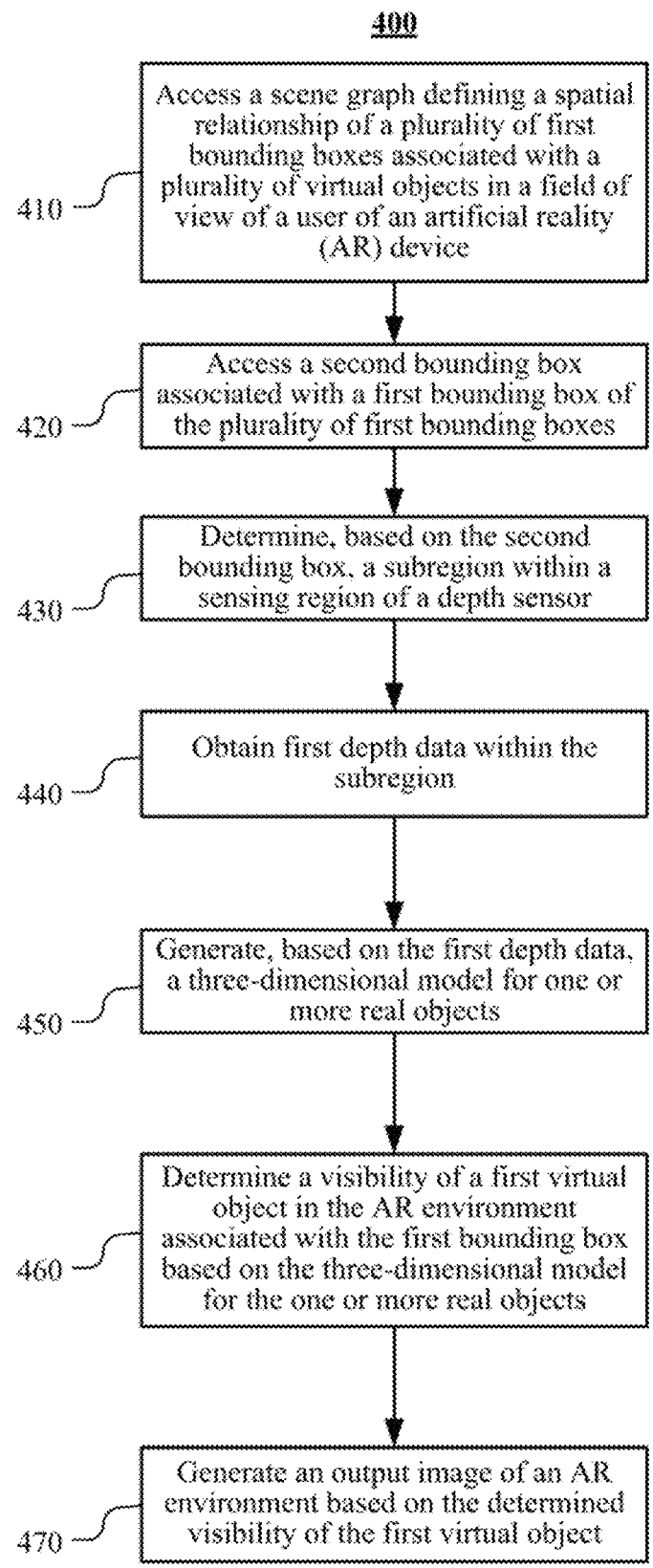
FIG. 4 illustrates an example method for generating an output image of an AR environment.

FIG. 4 illustrates an example method 400 for generating an output image of an AR environment. The method may begin at step 410, where a computing system accesses a scene graph defining a spatial relationship of a plurality of first bounding boxes associated with a plurality of virtual objects in a field of view of a user of an artificial reality (AR) device. Bounding boxes may be two-dimensional (e.g., representing the 2D area surrounding an object from the user's viewpoint) or three-dimensional (e.g., representing the 2D area surrounding an object and a depth range to encompass a volume surrounding an object in worldspace). In particular embodiments one or more bounding boxes may be an axis-aligned bounding box (AABB). In particular embodiments the bounding box associated with each object may be stored in the BVH and may share the same instance transform and instance with its associated occlusion object.

At step 420, the computing system may access a second bounding box associated with a first bounding box of the plurality of first bounding boxes. In particular embodiments a second bounding box in the scene graph may be associated with a first bounding box in the scene graph. For example, a first bounding box may encompass a plurality of objects within the environment, whereas the second bonding box may encompass only one of the plurality of objects within the environment.

At step 430, the computing system may determine, based on the second bounding box, a subregion within a sensing region of a depth sensor. For example and not by way of limitation, a depth sensor used to collect or access depth data at step may have a resolution of 512×512, which produces large quantities of depth data when sampling. If this high resolution depth sensor samples the entire field of view or real environment of the user, the computing system must collect, transport, and process a large quantity of depth data given the size of the sample region and resolution of the depth sensor. Instead, by utilizing region of interest 280 to reduce the region of the environment that is sampled by the depth sensor to the region of interest 280.

At step 440, the computing system may obtain first depth data within the subregion. The depth data may be determined relative to a particular pose or viewpoint of a user of an HMD in the real environment. In particular embodiments the depth data may be for a region or subregion of the real environment. In particular embodiments the depth data may be sparse depth data. In particular embodiments the computing system may access depth data from one or more sensors to improve the fidelity of sparse depths or make the depth data more accurate.

At step 450, the computing system may generate, based on the first depth data, a three-dimensional model for one or more real objects. For example, a 3D mesh may be generated that represents an object in the environment. In particular embodiments the 3D mesh may be based on the depth data. For example, a 3D mesh is generated by selecting one of the mipmaps 235 generated at step 230 and generating a polygon mesh (e.g., triangles) by connecting each vertex in the grid of the mipmap to its neighbors in every direction.

At step 460, the computing system may determine a visibility of a first virtual object in the AR environment associated with the first bounding box based on the three-dimensional model for the one or more real objects. For example, whether a particular object (or portion thereof) in the user's environment is visible or occluded from a particular viewpoint may be determined by performing a visibility analysis based on the depth tessellation and bounding box or occlusion object stored in the BVH. Using the BVH to limit the field of search to a particular node or section of the BVH structure may result in more efficient operations with reduced latency. At step 470, the computing system may generate an output image of an AR environment based on the determined visibility of the first virtual object.

In particular embodiments, one or more steps of method 400 may be additionally or alternatively performed by a second computing system and transmitted to a first computing system. In particular embodiments the second computing system may be relatively powerful (e.g., a laptop, smartphone, etc.) when compared to the first computing system, because the first computing system (e.g., a HMD) may have limited system resources that may not appreciably be increased without resulting in too much weight, size, and/or heat for the user's comfort.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for generating an output image of an AR environment including the particular steps of the method of FIG. 4, this disclosure contemplates any suitable method for generating an output image of an AR environment including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
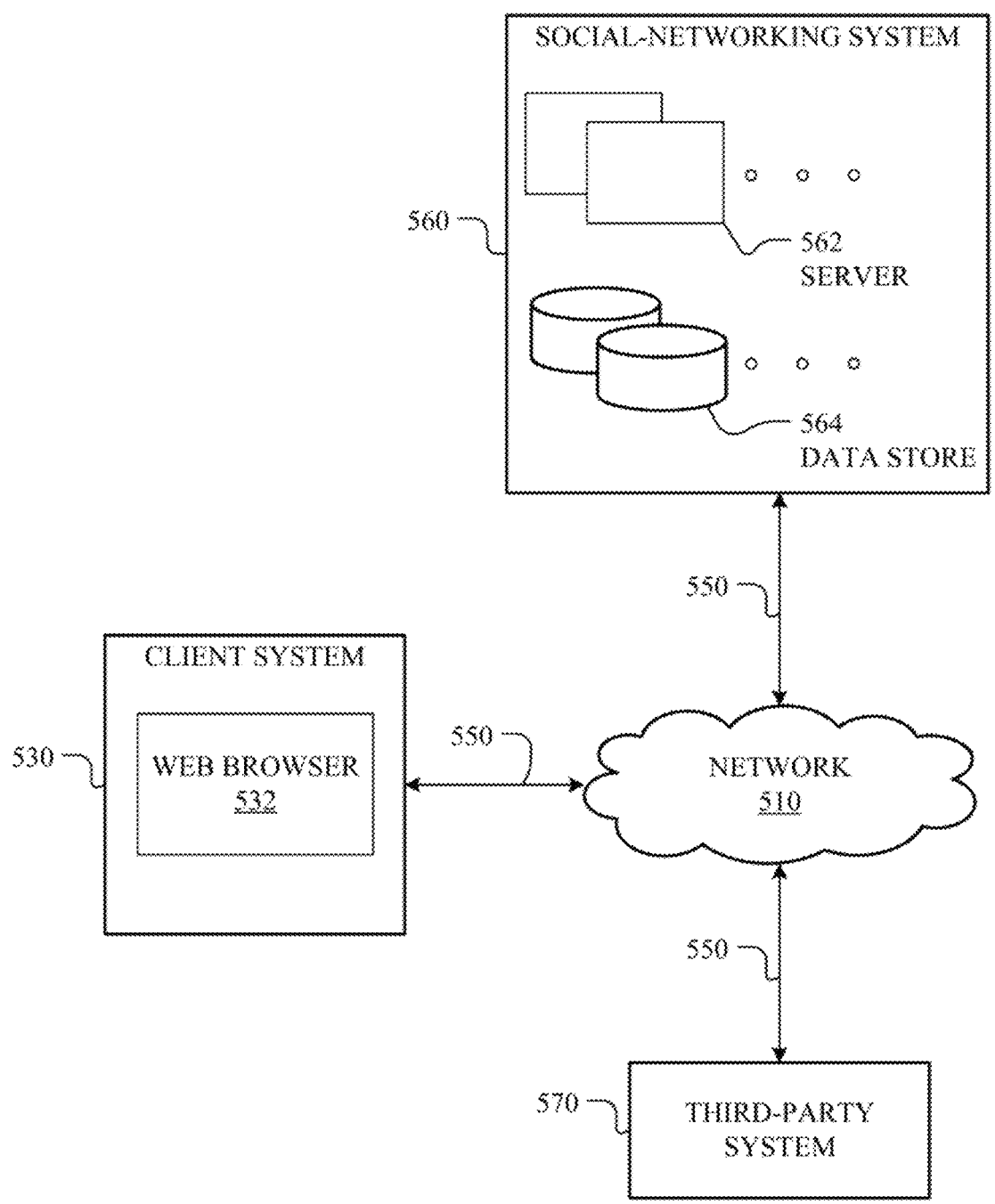
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, and may have one or more add-ons, plug-ins, or other extensions. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
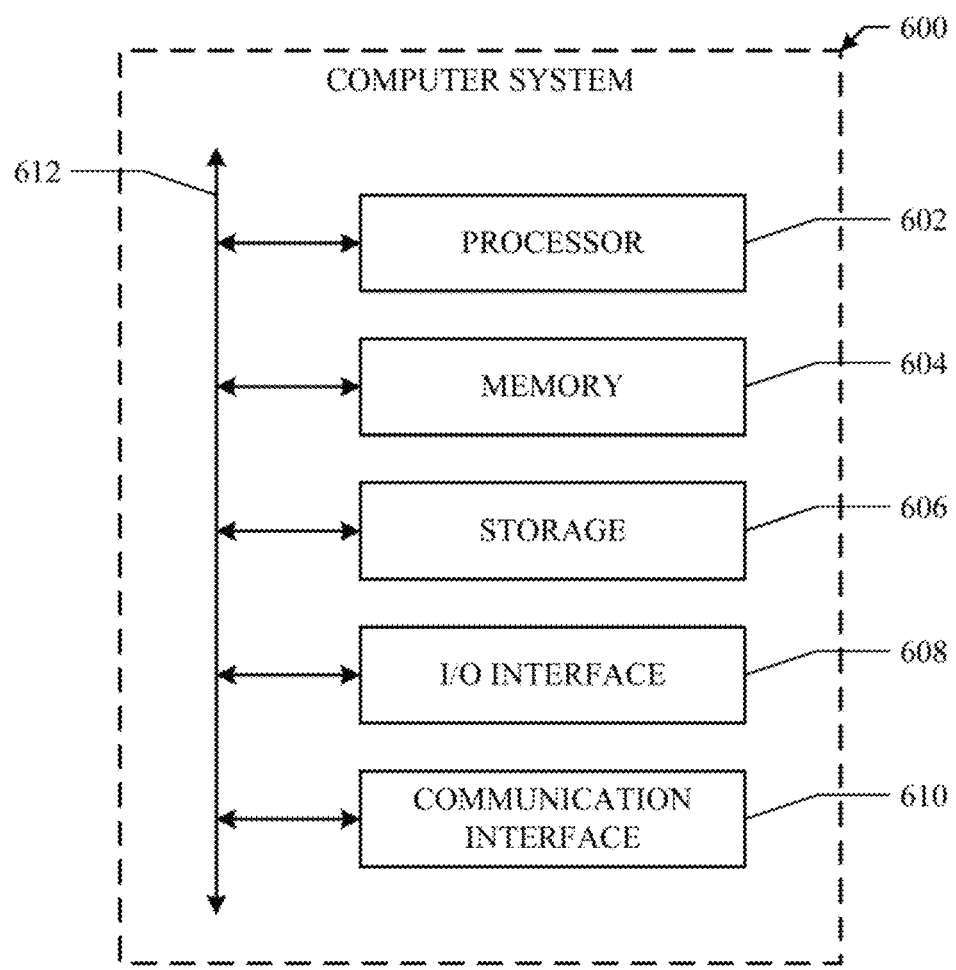
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing a scene graph defining a spatial relationship of a plurality of first bounding boxes associated with a plurality of virtual objects in a field of view of a user of an artificial reality (AR) device;
accessing a second bounding box associated with a first bounding box of the plurality of first bounding boxes;
determining, based on the second bounding box, a subregion within a sensing region of a depth sensor;
obtaining first depth data within the subregion;
generating, based on the first depth data, a three-dimensional model for one or more real objects;
determining a visibility of a first virtual object in an AR environment associated with the first bounding box based on the three-dimensional model for the one or more real objects; and
generating an output image of the AR environment based on the determined visibility of the first virtual object.

2. The method of claim 1, wherein the scene graph comprises a bounding volume hierarchy.

3. The method of claim 1, further comprising generating a plurality of mipmaps of subregion, wherein the three-dimensional model is generated based on at least one of the plurality of mipmaps.

4. The method of claim 3, wherein the plurality of mipmaps are generated based on a plurality of corresponding densified depth maps of the subregion.

5. The method of claim 3, wherein the at least one mipmap used to generate the three-dimensional model is selected based on a distance of the one or more real objects from the user.

6. The method of claim 3, wherein the at least one mipmap used to generate the three-dimensional model is selected based on a position of the one or more real objects relative to a fovea of the user.

7. The method of claim 3, wherein the at least one mipmap used to generate the three-dimensional model is selected based on available computing resources of the computing system.

8. The method of claim 1, further comprising storing the three-dimensional model in the scene graph.

9. The method of claim 1, wherein the first bounding box is an axis-aligned bounding box.

10. The method of claim 1, wherein the depth sensor is configured to only collect the depth data from the subregion within the sensing region of the depth sensor.

11. One or more computer-readable non-transitory storage media embodying software that is operable when executed to:
access a scene graph defining a spatial relationship of a plurality of first bounding boxes associated with a plurality of virtual objects in a field of view of a user of an artificial reality (AR) device;
access a second bounding box associated with a first bounding box of the plurality of first bounding boxes;
determine, based on the second bounding box, a subregion within a sensing region of a depth sensor;
obtain first depth data within the subregion;
generate, based on the first depth data, a three-dimensional model for one or more real objects;
determine a visibility of a first virtual object in an AR environment associated with the first bounding box based on the three-dimensional model for the one or more real objects; and
generate an output image of the AR environment based on the determined visibility of the first virtual object.

12. The media of claim 11, wherein the scene graph comprises a bounding volume hierarchy.

13. The media of claim 11, wherein the software is further operable when executed to generate a plurality of mipmaps of subregion, wherein the three-dimensional model is generated based on at least one of the plurality of mipmaps.

14. The media of claim 13, wherein the plurality of mipmaps are generated based on a plurality of corresponding densified depth maps of the subregion.

15. The media of claim 13, wherein the at least one mipmap used to generate the three-dimensional model is selected based on a distance of the one or more real objects from the user.

16. The media of claim 13, wherein the at least one mipmap used to generate the three-dimensional model is selected based on a position of the one or more real objects relative to a fovea of the user.

17. A system comprising:
one or more processors; and
one or more computer-readable non-transitory storage media coupled to one or more of the processors and comprising instructions operable when executed by one or more of the processors to cause the system to:
access a scene graph defining a spatial relationship of a plurality of first bounding boxes associated with a plurality of virtual objects in a field of view of a user of an artificial reality (AR) device;
access a second bounding box associated with a first bounding box of the plurality of first bounding boxes;
determine, based on the second bounding box, a subregion within a sensing region of a depth sensor;
obtain first depth data within the subregion;
generate, based on the first depth data, a three-dimensional model for one or more real objects;
determine a visibility of a first virtual object in the AR environment associated with the first bounding box based on the three-dimensional model for the one or more real objects; and
generate an output image of an AR environment based on the determined visibility of the first virtual object.

18. The system of claim 17, wherein the scene graph comprises a bounding volume hierarchy.

19. The system of claim 17, wherein the processors are further operable when executing the instructions to generate a plurality of mipmaps of subregion, wherein the three-dimensional model is generated based on at least one of the plurality of mipmaps.

20. The system of claim 19, wherein the plurality of mipmaps are generated based on a plurality of corresponding densified depth maps of the subregion.

\* \* \* \* \*